Figure 1:
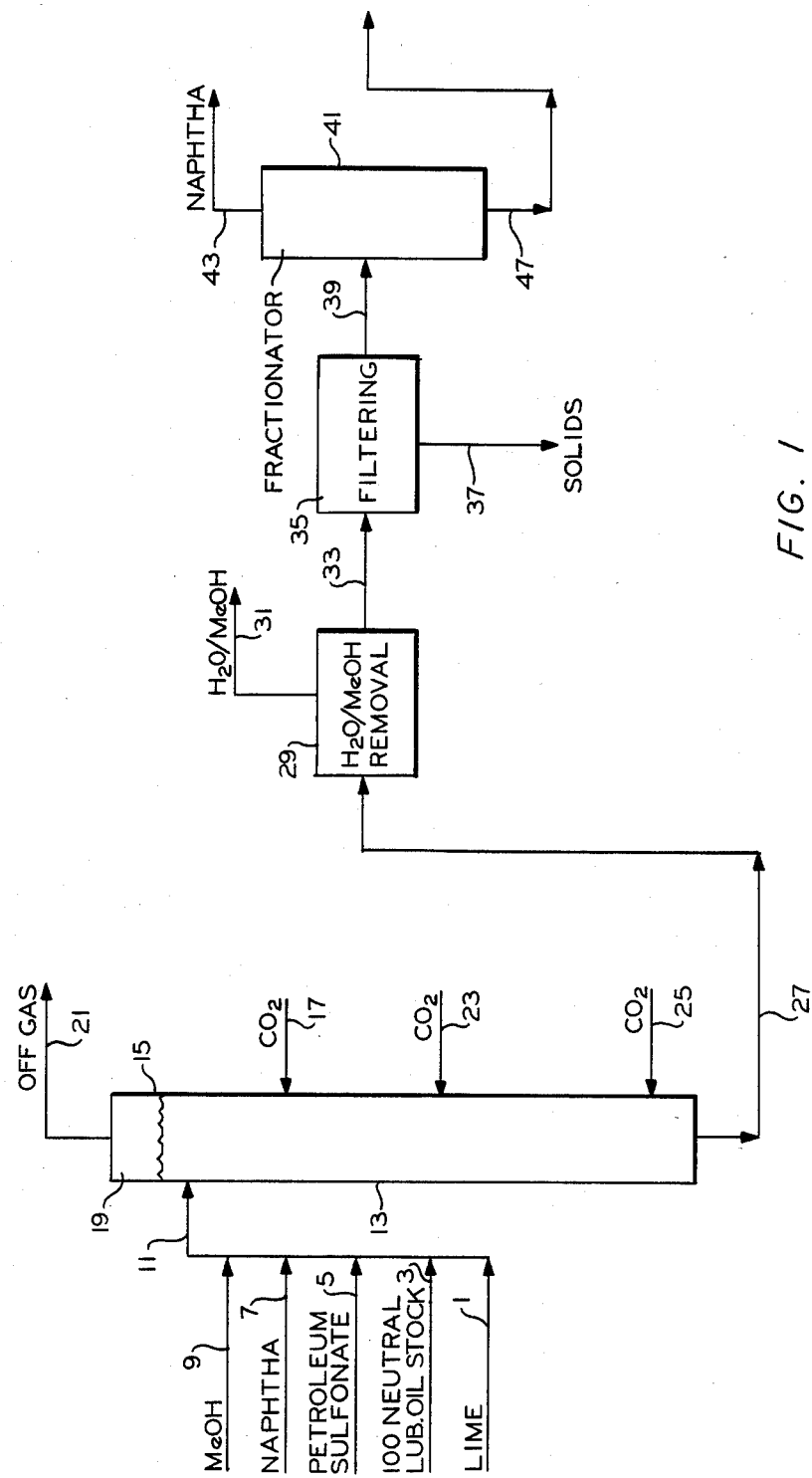

United States Patent [19]

Jack et al.

[11] Patent Number: 4,557,840

[45] Date of Patent: Dec. 10, 1985

[54] CONTINUOUS PROCESS FOR OVERBASING PETROLEUM SULFONATE IN A PIPE REACTOR WITH MULTIPLE ENTRY OF COUNTERCURRENT CARBON DIOXIDE

[75] Inventors: Douglas S. Jack, Bartlesville, Okla.; Homer J. Sarrett, Jr., deceased, late of Bartlesville, Okla., by Vivian Sarrett, Administratrix

[73] Assignee: Phillips Petroleum Company, Bartlesville, Okla.

[21] Appl. No.: 609,366

[22] Filed: May 11, 1984

[51] Int. Cl.⁴ ............................................. C10M 1/40
[52] U.S. Cl. ...................... 252/33.2; 252/18; 252/25; 261/114 R
[58] Field of Search .................. 252/33, 33.2, 18, 25; 422/231, 129; 261/114 R

[56] References Cited

U.S. PATENT DOCUMENTS

| | | | |
|---|---|---|---|
| 2,478,707 | 8/1949 | Purvin | 422/129 |
| 2,762,819 | 9/1956 | Bollens | 422/129 |
| 2,916,527 | 12/1959 | Adams et al. | 261/114 R |
| 3,027,325 | 3/1962 | McMillen et al. | 252/33 |
| 3,057,896 | 10/1962 | Schlicht et al. | 260/435 |
| 3,105,049 | 9/1963 | Voorhees | 252/33 |
| 3,135,693 | 6/1964 | Whitney et al. | 252/33 |
| 3,223,630 | 6/1967 | Fowler et al. | 252/25 |
| 3,295,841 | 1/1967 | Hutchinson | 261/114 R |
| 3,318,809 | 5/1967 | Bray | 252/33 |
| 3,384,585 | 5/1968 | Gragson et al. | 252/33 |
| 3,524,814 | 8/1970 | Munster et al. | 252/33.2 |
| 3,865,737 | 2/1975 | Kemp | 252/33.4 |
| 4,087,252 | 5/1978 | Strahorn et al. | 422/231 |
| 4,100,084 | 7/1978 | Powers, III | 252/39 |
| 4,148,740 | 4/1979 | Cease et al. | 252/33.2 |
| 4,165,291 | 8/1979 | Gragson | 252/33 |
| 4,206,062 | 6/1980 | Derbyshire | 252/33.2 |
| 4,427,559 | 1/1984 | Whittle | 252/33.2 |

Primary Examiner—William R. Dixon, Jr.
Assistant Examiner—Margaret B. Medley
Attorney, Agent, or Firm—A. W. Umphlett

[57] ABSTRACT

A method and apparatus for the continuous overbasing of petroleum sulfonate in which a pipe reactor having a multiplicity of feed points along the reactor is used to contact a reaction mixture of neutral petroleum sulfonate, 100 neutral lube oil stock, lime, methanol, and naphtha with a counterflow of carbon dioxide.

6 Claims, 1 Drawing Figure

CONTINUOUS PROCESS FOR OVERBASING PETROLEUM SULFONATE IN A PIPE REACTOR WITH MULTIPLE ENTRY OF COUNTERCURRENT CARBON DIOXIDE

BACKGROUND OF THE INVENTION

This invention relates to overbasing a calcium petroleum sulfonate. In another of its aspects this invention relates to the preparation of a lubricating oil additive. In still another of its aspects this invention relates to the production of calcium petroleum sulfonate having a high total base number (TBN) for use as an additive in lubricating oils, particularly crankcase oils for internal combustion engines to impart detergency and reduce sludge formation.

In one of its concepts this invention provides a process for overbasing a calcium petroleum sulfonate by manipulation of process steps or process conditions, particularly the addition of carbon dioxide, to provide a product having a TBN in desirable range.

Among the materials that impart detergency to lubricating oils thereby being of assistance in keeping internal engine parts clean and reducing sludge formation in the oil are overbased calcium petroleum sulfonates. These sulfonates are known to be useful as additives for lubricating oils, particularly crankcase oils for internal combustion engines.

It is known that equivalent detergency characteristics can be obtained with a lower concentration of additive in a lubricating oil—the higher the alkaline reserve of an additive: the larger the quantity of acidic combustion products accumulated in the oil to which the additive is added that can be neutralized by the additive. The measurement of alkaline reserve is reported as total base number (TBN) which is the number of milligrams of potassium hydroxide equivalent to the amount of acid required to neutralize the alkaline constituents present in one gram of sample. An additive having a total base number higher than can be obtained from calcium petroleum sulfonate alone is commonly said to be "overbased" or, alternatively, is said to be "superbasic".

Petroleum sulfonic acid which is neutralized to form petroleum sulfonates normally includes appreciable amounts of various hydrocarbons not having the acid group capable of forming the sulfonate so that the resulting product is a mixture of hydrocarbons and petroleum sulfonates. When the sulfonic acid is neutralized with an excess of CaO or $Ca(OH)_2$ to form the sulfonate, the resulting product has a relatively small alkaline reserve. The addition of a large excess of neutralizing material normally does not materially increase the alkaline reserve since the excess material is removed, usually by filtration, prior to the use of the sulfonate in a lubricant. The previously known processes for overbasing calcium petroleum sulfonates have experienced difficulty in obtaining sufficiently high alkaline reserves, e.g., TBN of 300 mg KOH/gm or higher, to enable the formulator to use lower amounts of additive while maintaining equivalent detergency or to protect the engine adequately under conditions of high acid formation in the combustion process.

It has been found that petroleum sulfonate can be overbased continuously to provide a product of desirably high TBN using a simple pipe reactor with multiple entry of $CO_2$. This reactor is believed to be effective because it offers a non-turbulent flow of reaction mixture with which a counterflow of $CO_2$ can be efficiently reacted by introduction at more than one point within the reactor. This flow is in contrast to the use of multiple continuously stirred tank reactors which requires continuous turbulence to maintain sufficient contact between particulate lime which tends to settle rapidly and the other constituents of the reaction mixture.

It is therefore an object of this invention to provide an overbased calcium petroleum sulfonate having high alkaline reserve. It is another object of this invention to provide lubricating additive containing overbased calcium petroleum sulfonate having high alkaline reserve. It is another object of the invention to provide a process for preparing an overbased calcium petroleum sulfonate having high alkaline reserve. It is still another object of this invention to provide a process for preparing a lubricating additive containing overbased calcium petroleum sulfonate having a high alkaline reserve.

Other aspects, concepts, and objects of this invention along with its several advantages will be apparent from a study of this disclosure and the appended claims.

STATEMENT OF THE INVENTION

According to this invention there is provided a method for the continuous overbasing of petroleum sulfonate in which a downflow of a reaction mixture of (1) neutral petroleum sulfonate, (2) 100 neutral lube oil stock (100 SUS at 100° F.), (3) calcium hydroxide, (4) methanol, and (5) naphtha is contacted in a pipe reactor with a counterflow of carbon dioxide introduced at a multiplicity of feed points along the reactor with collection of an overbased petroleum sulfonate reaction product as reactor effluent. Preferably, there are three feed points for $CO_2$.

In another embodiment of the invention an apparatus is provided for the continuous overbasing of petroleum sulfonate in which there is a vertical pipe reactor having means for maintaining a vapor space over a liquid level in the reactor and means to remove off gas from the top of the reactor. There are also means for inlet of feedstock comprising (i) neutral petroleum sulfonate, (ii) 100 neutral lube oil stock, (iii) calcium hydroxide, (iv) methanol and (v) naphtha below the liquid level in the reactor and multiple means for the controlled inlet of carbon dioxide along the length of the pipe reactor so that a reaction product can be produced by counterflow of carbon dioxide and feedstock with means for removal of the reaction product from the base of the pipe reactor.

In a further embodiment of the invention the reactor effluent is treated to remove water and methanol, filtered to remove solids, and fractionated to remove naphtha so that a mixture of overbased petroleum sulfonate and 100 neutral lube stock remains as product.

According to the invention the reactor is a pipe having a diameter of about 1 inch to about 8 inches, preferably about 2 inches to about 4 inches and with the liquid level maintained in a range of about 4 feet to about 40 feet, preferably about 10 feet to about 30 feet above the reactor outlet. The reaction mixture, which will be described below, is fed below the liquid level. Carbon dioxide is fed into the side of the reactor at a multiplicity of points, preferably three points, along its length which can vary in position according to the diameter of the reactor and the depth of the reaction liquid in the reactor, but which will generally be positioned when three feed points are used so that the uppermost feed point is about 30 to about 60 percent of the distance between the liquid level and the outlet of the reactor, the second feed point is about 50 to about 70 percent of the distance from the liquid level to the outlet of the reactor, and the third feed point is about 70 to about 95 percent of the distance from the liquid level to the outlet of the reactor.

The amount of carbon dioxide fed at each of the points along the reactor can vary considerably but, when three feed points are used, at the first or uppermost inlet will generally range from about 15 to about 25 volume percent of the total $CO_2$ fed into the reactor, at the second or middle $CO_2$ inlet the flow will generally be within the range of about 25 to about 35 volume percent of the total $CO_2$ fed to the reactor and at the third or lowest feed point in the reactor the flow will generally be about 45 to about 55 volume percent of the total $CO_2$ fed to the reactor.

The reaction conditions will generally fall within a range of pounds lime/pound sulfonate of about 1.2 to about 1.6 and a $CO_2$/lime mole ratio of about 0.5 to about 0.9.

The liquid level, using three feed points for $CO_2$, can range from about 10 feet to about 15 feet particularly if the reactor is a two inch diameter pipe. The reaction temperature will be maintained so that the reaction hotspot which will be between the second and third carbon dioxide inlet will be in a range of about 105° F. to about 130° F. preferably 112° F. to 123° F. Unreacted carbon dioxide is vented from the top of the reactor to maintain the reactor liquid level. The flow through the reactor will be maintained for a resident time of about 30 to about 60 minutes.

This invention provides a continuous process for producing a detergent-dispersive additive for motor oils by reacting carbon dioxide ($CO_2$) with lime, $Ca(OH)_2$, in the presence of methanol and simultaneously dispersing the resulting calcium carbonate ($CaCO_3$) in a 50/50 mixture of calcium petroleum sulfonate and 100 neutral stock lubricating oil. The reaction is carried out in naphtha solvent. The product is then stripped of water and methanol, filtered to remove the solids and stripped of naphtha. The finished product is a colloidal dispersion of $CaCO_3$ in a range of about 27 to about 30 weight percent usually about 27 weight percent in the 50/50 calcium petroleum sulfonate/100 neutral lube stock mixture.

Although overbased petroleum sulfonates can be produced in a series of three continuous stirred tank reactors such a system is found to be insufficiently tolerant of feedstock variations to be commercially feasible.

The petroleum sulfonates useful in the present invention can be described as neutral petroleum sulfonate prepared by sulfonating KC250 bright stock (200 SUS at 210° F.). See U.S. Pat. No. 3,135,693 incorporated here by reference.

The neutral lube oil useful in this invention can be described as solvent refined 100 neutral lube oil stock having a viscosity of 100 SUS at 100° F.

The lime, calcium hydroxide, useful in the present invention can have a surface area of about 5 to about 50 $M^2/g$. The lime is not soluble in the reaction mixture and is of sufficient density to tend to settle rapidly. A preferred hydrated lime or slaked lime $Ca(OH)_2$, is Kemilime manufactured by Ash Grove Cement Co., Kansas City, MO.

The methanol (MeOH) useful in this invention as promoter/solvent is described as methanol having 0 to 10 weight percent $H_2O$.

The naphtha used as diluent in this invention is described as petroleum naphtha with boiling pont range 80° C.–300° C.

The $CO_2$ useful in this invention is described as technical grade or more chemically pure $CO_2$.

General reaction conditions to make overbased product having 300 total base number (defined as Mg.KOH equivalent/gram product are as follows: The temperature for the carbonation reaction can range from 25° C. (77° F.) to 80° C. (176° C.), preferably 35° C. (95° F.) to 65° C. (149° F.). Pressure of the carbonation reaction can range from 1 psia to 30 psia, preferably 10 to 20 psia. The overbasing (carbonation) residence or reaction time can vary from 20 minutes to 120 minutes, preferably 50 to 70 minutes overall.

Feed component concentrations for the carbonation reaction are as follows:

| Component | Weight % of Total Feed | |
|---|---|---|
| | In General | Preferred |
| Carbon Dioxide ($CO_2$) | 2.0 to 10 | 4 to 7 |
| Hydrated Lime ($Ca(OH)_2$) | 5.0 to 20 | 10 to 15 |
| Neutral Oil (Calcium) (Petroleum Sulfonate) | 5.0 to 15 | 7 to 12 |
| No. 10 Lubricating Oil Stock | 5.0 to 15 | 7 to 12 |
| Naphtha | 30.0 to 80.0 | 50 to 70 |
| Methanol | 2.0 to 10.0 | 3 to 7 |

The $CO_2$ is added as a vapor, lime as a solid and the rest of the components as liquids. In addition up to 1.0 weight percent water can be added in the feed and still achieve 300 total base number. Initial water concentrations greater than 1.0 weight percent, however, can be detrimental by reducing the base number of the product.

The invention can best be described in conjunction with the drawing which is a schematic representation of the apparatus and process of the invention.

Referring now to the drawing, lime is fed through line (1) 100 neutral lube oil stock through line (3) petroleum sulfonate through line (5) naphtha through line (7) and methanol through line (9) into feed line (11) which provides a mixture of reactants into pipe reactor (13). For the purpose of this exemplification the reactor is a two inch diameter pipe reactor in which the liquid level (15) is maintained at a level about 167 inches above the outlet end of the reactor. The total feed through line (11) is two gallons/hour of a 7.08 pound per gallon specific gravity liquid which is a mixture of one pound petroleum sulfonate, 0.94 pounds 100 neutral lube oil, 1.4 pounds lime, 10.8 pounds of naphtha and 0.8 pounds of methanol. The reaction mixture enters the reactor at a temperature of about 82° F.

Carbon dioxide enters the reactor through line (17) which is 64 inches below the liquid level at a rate of 1 SCFH and passes in countercurrent flow with the reaction mixture with the unreacted carbon dioxide passing into the vapor space (19) at the top of the reactor an outlet (21) as off gas. Carbon dioxide passes into the reactor through line (23) at the second inlet point which is 93 inches below the liquid level and flows countercurrently to the reaction mixture with unreacted $CO_2$ bubbling up to the vapor space (19) to be taken through line (21) as off gas. Similarly, $CO_2$ enters the reactor (13) through line (25) which is at a point 149 inches below the liquid level (15) and bubbles vertically through the reactor countercurrent to the reaction mixture flow with the unreacted $CO_2$ passing through the vapor space (19) and out the off gas line (21). For the purpose of this illustration the carbon dioxide is fed with 20 volume percent entering through the first $CO_2$ feed line (17), 30 volume percent entering through the second $CO_2$ feed line (23) and 50 volume percent entering through the third, or lowest, feed line (25).

Within the reactor the reaction temperature was measured at 105° F. at a point 48 inches below the liquid level, 109° F. at a point 73 inches below the liquid level, 116° F. at a point 111 inches below the liquid level and 119° F., the "hotspot", at a point 129 inches below the liquid level. Outlet temperature for the reactor is a reaction product temperature of 95° F. The reaction product leaving reactor (13) through line (27) had a TBN of 318.

Effluent from the reactor is passed through line (27) into a dryer system (29) maintained at a temperature in a range of about 220° to about 250° F. in which water and methanol are removed through line (31). The dried liquid is then passed through line (33) to a filtering means, preferably a commercial rotary filter (35) from which solids are removed through line (37). The filtered liquid is passed through line (39) to a two step fractionator system (41) maintained at atmospheric conditions for step one and vacuum conditions in step two in which the naphtha is removed as overhead through line (43) and the overbased petroleum sulfonate/100 neutral stock mixture is removed as product through line (47).

A series of 14 runs was carried out using different ratios of lime to petroleum sulfonate and using different ratios of mole $CO_2$ to mole lime. The results of these runs which were carried out under conditions and in the equipment as set out above were recorded in Table I and show that product of acceptable TBN, i.e., above 270, and of superior TBN, above 300, can be made using the apparatus and method of the present invention.

TABLE I

| TBN PRODUCED | | | |
|---|---|---|---|
| Pounds Lime/Pound Sulfonate | 1.22 | 1.40 | 1.54 |
| Mole $CO_2$/Mole Lime | TBN RESULTS BELOW | | |
| 0.50 | — | — | 280 |
| 0.56 | — | — | 300 |
| 0.63 | 268 | 298 | 317 |
| 0.70 | 278 | 311 | 341 |
| 0.77 | 306 | 328 | 343 |
| 0.84 | 279 | 322 | — |
| 0.91 | — | 286 | — |

We claim:

1. A method for the continuous overbasing of petroleum sulfonate comprising contacting in a vertical pipe reactor at reaction conditions a downflow of a reaction mixture comprising (1) neutral petroleum sulfonate, (2) 100 neutral lube oil stock, (3) lime $Ca(OH)_2$, (4) MeOH, and (5) naphtha with a counterflow of $CO_2$ introduced at a multiplicity of feed points along the length of the reactor below the reaction mixture inlet and collecting overbased petroleum sulfonate reaction product as reactor effluent.

2. A method of claim 1 in which there are three feed points for the introduction of $CO_2$ along the length of the reactor with the uppermost feed point about 30 to about 60 percent of the distance between the liquid level and the outlet of the reactor, the second feed point about 50 to about 70 percent of the distance from the liquid level to the outlet of the reactor, and the third feed point about 70 to about 95 percent of the distance from the liquid level to the outlet of the reactor, with the amount of $CO_2$ fed at the uppermost inlet in the range of about 15 to about 25 volume percent of the total $CO_2$ fed into the reactor, the amount of carbon dioxide fed at the second $CO_2$ inlet within a range of about 25 to about 35 volume percent of the total $CO_2$ fed to the reactor and the amount of $CO_2$ fed at the third feed point about 45 to about 55 volume percent of the total $CO_2$ fed to the reactor.

3. A method of claim 1 wherein the conditions for reaction are 1.2 to 1.6 pounds lime/pound sulfonate.

4. A method of claim 2 wherein the conditions for reaction are $CO_2$/lime mol ratio of 0.5 to 0.9.

5. An apparatus for the continuous overbasing of petroleum sulfonate comprising:
   (a) a vertical pipe reactor;
   (b) means for maintaining a vapor space over a liquid level in said reactor;
   (c) means below said liquid level for inlet of feedstock comprising (i) neutral petroleum sulfonate, (ii) 100 neutral lube oil stock, (iii) calcium hydroxide, (iv) methanol and (v) naphtha;
   (d) multiple means below the reaction mixture inlet for controlled inlet of $CO_2$ along the length of said pipe reactor;
   (e) means to remove off gas from the top of said reactor; and
   (f) means to remove reaction product from the base of said pipe reactor.

6. An apparatus of claim 5 wherein there are three means for controlled inlet of $CO_2$ with the uppermost means about 30 to about 60 percent of the distance between the liquid level and the outlet of the reactor, the second inlet means about 50 to about 70 percent of the distance between the liquid level to the outlet of the reactor, and the third inlet means about 70 to about 95 percent of the distance between the liquid level to the outlet of the reactor.

* * * * *